M. A. DEES.
PNEUMATIC TIRE.
APPLICATION FILED SEPT. 18, 1911.
1,086,757.
Patented Feb. 10, 1914.
2 SHEETS—SHEET 1.
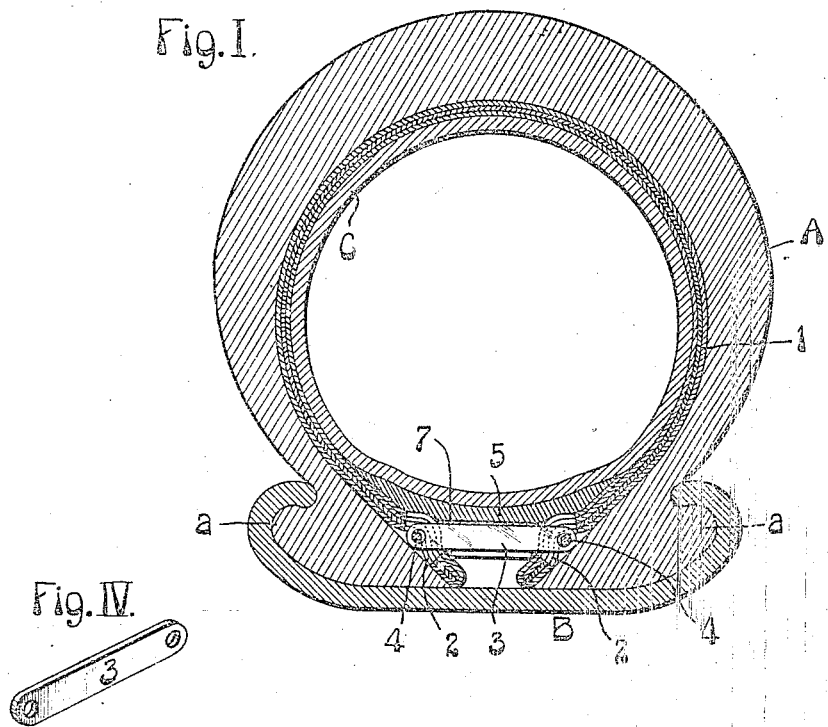
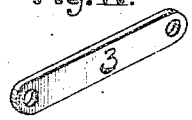
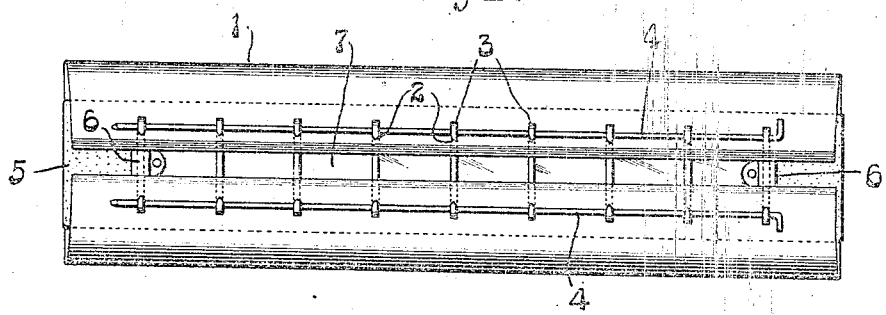
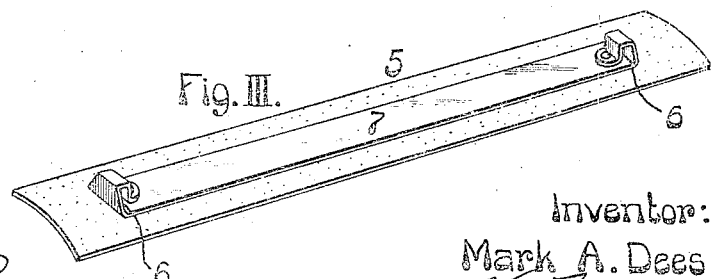
Attest
A. J. McCauley
E. B. Ping
Inventor:
Mark A. Dees
by Knight & Cook
Att'ys.

M. A. DEES.
PNEUMATIC TIRE.
APPLICATION FILED SEPT. 18, 1911.
1,086,757.
Patented Feb. 10, 1914.
2 SHEETS—SHEET 2.
Fig. V.
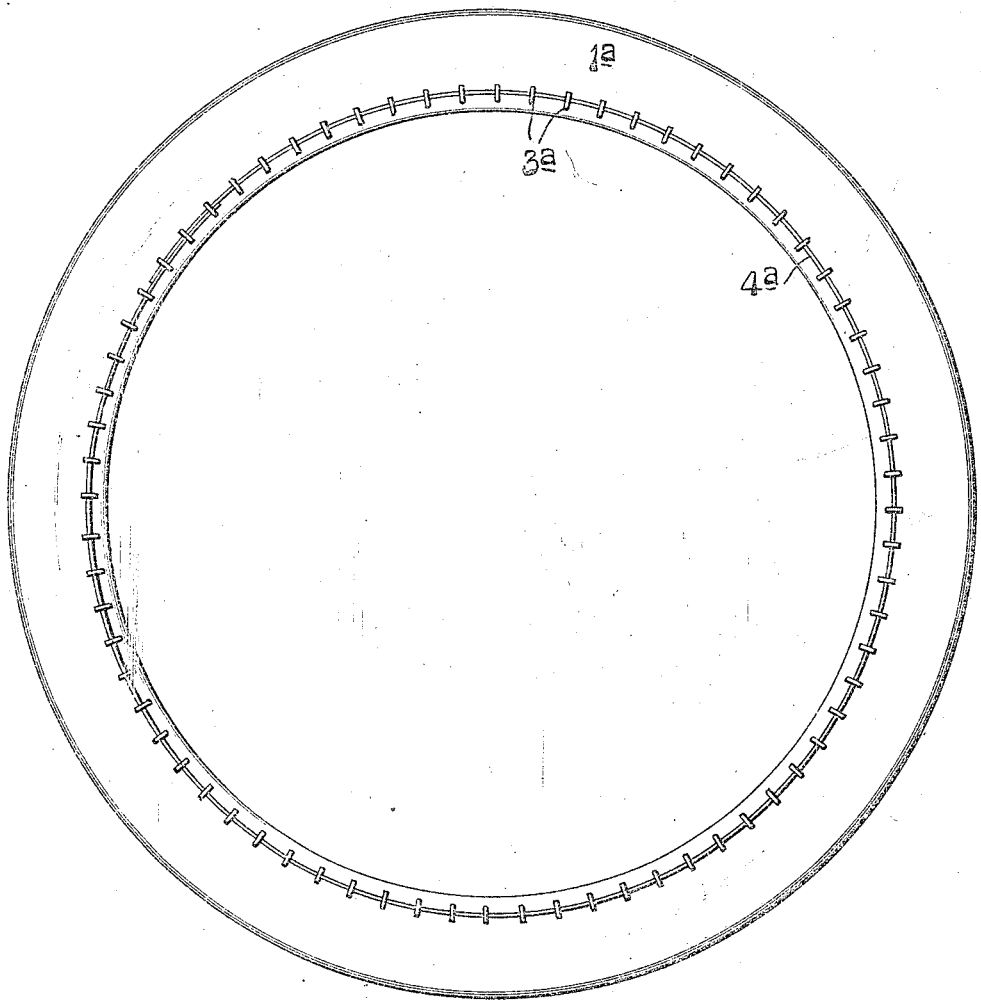
Attest
a. J. McCauley
C. B. Ling
Inventor:
Mark A. Dees
by Knight & Cook
Att'ys.

UNITED STATES PATENT OFFICE.

MARK A. DEES, OF PASCAGOULA, MISSISSIPPI, ASSIGNOR TO AMERICAN TIRE COMPANY, OF ST. LOUIS, MISSOURI, A CORPORATION OF MISSOURI.

PNEUMATIC TIRE.

1,086,757.

Specification of Letters Patent. Patented Feb. 10, 1914.

Application filed September 18, 1911. Serial No. 649,225.

*To all whom it may concern:*

Be it known that I, MARK A. DEES, a citizen of the United States of America, residing at Pascagoula, in the county of Jackson and State of Mississippi, have invented certain new and useful Improvements in Pneumatic Tires, of which the following is a full, clear, and exact description, reference being had to the accompanying drawings, forming part of this specification.

My invention relates to pneumatic tires and, more particularly stated, to jackets for the inner tubes of such tires utilized for the purpose of preventing undue expansion of such tubes at weakened or fractured points in the outer tire casing to result in the occurrence of what are generally known as "blow outs" of the inner tubes.

One of the objects of the present invention is to provide a jacket of the kind mentioned with fastening means for holding the separable edges of the jacket from separation and which also serve as means for holding the beads of the outer casing firmly seated in the tire receiving rim of the vehicle wheel.

A further object of my present invention is to provide a novel and efficient guard device between the inner tube and the jacket fastening members and means in connection with such guard for securing it to the fastening members and whereby the fastening members are so held as to cause them to perform the double duty of connecting the separable edges of the jacket and holding the beads of the outer tire casing firmly and positively seated in the tire receiving rim.

Figure I is a cross section through a pneumatic tire containing a jacket made in accordance with my improvement. Fig. II is an elevation of a short length jacket made in accordance with my improvement. Fig. III is a perspective view of the guard utilized between the jacket fastening members and the inner tube of the tire. Fig. IV is a perspective view of the fastening link bars. Fig. V is a side elevation of an endless jacket made in accordance with my improvement and adapted to completely house an inner tube of a pneumatic tire.

In the accompanying drawings:—A designates an outer casing of a pneumatic tire provided with beads *a* and of common construction.

B is a tire receiving rim such as usually carried by vehicle wheels to which pneumatic tires are applied and in which the beads of the outer casing A are confined.

C is an inner inflatable tube in the outer casing that is adapted to be protected by the jacket to which my present invention pertains.

1 designates my protective jacket, which, as seen in Figs. I and II, is of sheet form and is adapted to be wrapped around the inner tube of the pneumatic tire at a point where the outer tire casing may have been injured or weakened. The jacket is provided adjacent to its edges that approach each other at the inner circle of the tire with perforations 2 extending at desired intervals through the jacket, the perforations near one edge of the jacket being in alinement with those in the jacket near its opposite edge.

In order that the jacket 1 may perform its function of protecting and housing the portion of the inner tube to which it is applied, suitable fastening means are employed to connect the edges of the jacket, and these fastenings in the present instance are of such nature as to provide also for the retention of the beads of the outer casing in the tire receiving rim, as herein previously referred to. The structure of the fastenings, in order that they may perform the function last mentioned, is one of the important features of the present improvement and it should be here stated in this connection that when there is no provision for such fastening means acting to hold the outer casing beads in the tire receiving rim in using a jacket of the kind to which my invention relates, there is constant liability of the escape of such beads from the tire receiving rim and consequent separation of the tire from the vehicle wheel. Such result is due to the fact that the portions of the inner tube and casing jacket at the inner circle of the tire and the fastening means used in connection therewith occupy the space that in pneumatic tires as ordinarily made is filled by the inflated inner tube which in itself serves to hold the beads of the outer casing from disengagement with the tire receiving rim.

The fastening means I employ in my jacket comprise stiff connecting bars 3 which extend transversely of the jacket and through the perforations 2 therein into engagement with the internal faces of the outer tire casing opposite its beads a. The fastening means also comprise suitable keys 4 by which said connecting bars are maintained in position in the jacket in which they are employed. The connecting bars are arranged in series in which all of the bars are parallel with each other and the keys 4 are preferably wires or rods extending through all of the connecting bars adjacent to their ends and along the outer faces of the jacket, as seen most clearly in Fig. II.

It will be seen that structure described provides not only for the connection of the separable edges of the jacket, but also for such resistance against the movement of the inner edges of the outer tire casing toward each other as would result in the escape of the outer casing beads from the tire receiving rim.

5 designates a guard independent of the jacket 1 and occupying a position within said jacket at the inner circle of the tire. One of the offices of this guard is to withhold the inner tube of the tire from contact with the fastening members that connect the separable edges of the jacket 1, in order that it may not be injured by such fastening members. Another utility of the guard is that of its serving as a carrier for a device by which the connecting bars 3 are held parallel with each other in order that they will perform their proper functions of holding the outer casing beads in the tire receiving rim B. The means just referred to comprise eye members 6 secured to the guard member and preferably formed from a strip 7 of metal that extends longitudinally of the guard member. There are two of the eye members and they receive two of the connecting bars 3, as seen in Fig. II. By this arrangement the guard member 5 is not only secured to the jacket 1, but serves also to prevent any sidewise movement of the series of connecting bars, with the obvious result of making it imperative for the connecting bars to perform their service.

In Fig. V I have shown an endless jacket 1ª such as may be utilized to completely encircle an inner tube. This jacket has separable edges at its inner circle that are held from separation by the cross rods 3ª maintained in their proper positions by wires 4ª. The structure in this endless form of jacket is similar to that previously described, the only essential difference being that the jacket is endless to serve as a complete protective member for the inner tube of the tire, as compared with a jacket that houses only a portion of such inner tube.

I claim:—

1. The combination with an outer tire casing provided with beads adapted to be seated in a tire receiving rim and an inflatable tube within said casing, of a jacket surrounding said inner tube, stiff connecting bars extending through said jacket adjacent to its separable edges and bearing against said outer casing opposite its beads, and a guard between said inner tube and connecting bars, the said guard being provided with eye members through which certain of said connecting bars pass and by which the connecting bars are held parallel with each other.

2. The combination with an outer tire casing provided with beads adapted to be seated in a tire receiving rim and an inflatable tube within said casing, of a jacket surrounding said inner tube, stiff connecting bars extending through said jacket adjacent to its separable edges and bearing against said outer casing opposite its beads, and a guard between said inner tube and connecting bars, the said guard having a strip secured thereto provided with eyes through which certain of said connecting bars pass and by which said connecting bars are held parallel with each other.

MARK A. DEES.

In the presence of—
A. J. McCauley,
E. B. Linn.